(12) United States Patent
Maeder et al.

(10) Patent No.: US 10,397,050 B2
(45) Date of Patent: Aug. 27, 2019

(54) PROVIDING AND CONFIGURING A VIRTUAL BASE STATION

(71) Applicant: NEC Europe Ltd., Heidelberg (DE)

(72) Inventors: Andreas Maeder, Wuerzburg (DE); Peter Rost, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 22 days.

(21) Appl. No.: 15/572,800

(22) PCT Filed: May 11, 2015

(86) PCT No.: PCT/EP2015/060373
§ 371 (c)(1),
(2) Date: Nov. 9, 2017

(87) PCT Pub. No.: WO2016/180471
PCT Pub. Date: Nov. 17, 2016

(65) Prior Publication Data
US 2018/0139091 A1    May 17, 2018

(51) Int. Cl.
*H04L 12/24* (2006.01)
*H04W 88/08* (2009.01)
*H04W 16/18* (2009.01)
*H04W 84/04* (2009.01)

(52) U.S. Cl.
CPC ......... *H04L 41/0806* (2013.01); *H04W 16/18* (2013.01); *H04W 88/085* (2013.01); *H04W 84/042* (2013.01); *H04W 88/08* (2013.01)

(58) Field of Classification Search
None
See application file for complete search history.

(56) References Cited

U.S. PATENT DOCUMENTS

2015/0296392 A1* 10/2015 Chen .................... H04W 16/00
370/328

FOREIGN PATENT DOCUMENTS

EP          2925080 A1    9/2015
WO    WO 2014101531 A1    7/2014

OTHER PUBLICATIONS

Aleksandra Check,cloud RAN for Mobile Networks, a technology overview, year 2014 (DOI: 10.1109/COMST.2014.2355255), IEEE , vol. 17, 405-426.*
Aleksandra Check,cloud RAN for Mobile Networks, a technology overview, year 2014 (DOI: 10.1109/COMST.2014.2355255), IEEE , vol. 17, 405-426 (Year: 2014).*
Rost Peter et al: "Cloud technologies for flexible 5G radio access networks", IEEE Communications Magazine, IEEE Service Center; Piscataway, US, vol. 52, No. 5, May 1, 2014 (May 1, 2014), pp. 68-76, XP011559173.

(Continued)

*Primary Examiner* — Kouroush Mohebbi
(74) *Attorney, Agent, or Firm* — Leydig, Voit & Mayer, Ltd.

(57) ABSTRACT

A method for providing a virtual base station in a mobile network comprising a virtual base station (VBS), wherein the VBS comprises at least one radio access point (RAP) and a virtual radio access function (VRAF), includes configuring the VBS by providing a description of radio access functionalities, which are executed by the RAP or by the VRAF; and jointly executing the VBS locally on the at least one RAP and on a centralized entity (CE) forming a logical functional network entity.

14 Claims, 3 Drawing Sheets

(56) References Cited

OTHER PUBLICATIONS

3GPP TS 36.300 V12.2.0 (Jun. 2014), $3^{rd}$ Generation Partnership Project; Technical Specification Group Radio Access Network; Evolved Universal Terrestrial Radio Access (E-UTRA) and evolved Universal Terrestrial Radio Access Network (E-UTRAN); Overall description; Stage 2 (Release 2), Jun. 2014, pp. 1-215.

3GPP TS 23.003 V10.0.0 (Dec. 2010), $3^{rd}$ Generation Partnership Project; Technical Specification Group Core Network and Terminals; Numbering, addressing and identification (Release 10), Dec. 2010, pp. 1-77.

* cited by examiner

PROVIDING AND CONFIGURING A VIRTUAL BASE STATION

CROSS REFERENCE TO RELATED APPLICATIONS

This application is a U.S. National Stage Application under 35 U.S.C. § 371 of International Application No. PCT/EP2015/060373 filed on May 11, 2015. The International Application was published in English on Nov. 17, 2016 as WO 2016/180471 A1 under PCT Article 21(2).

FIELD

The present invention relates to a method for providing a virtual base station in a mobile network. The present invention further relates to a mobile network comprising at least one radio access point, 'RAP', at least one virtual radio access function, 'VRAF', and a centralized entity, 'CE', on which said VRAF is executed.

BACKGROUND

Virtualization allows in general a creation of a virtual machine acting like a real entity. For example software executed on this virtual machine is separated from the underlying hardware resources. With regard to mobile networks comprising a core network and a radio access network, 'RAN', virtualization means that parts of the radio access function are executed on a centralized entity like a cloud computing platform providing "virtual" computing and network resources behaving the same or similar as hardware resources. For example one of the benefits of a virtualization is the provisioning of computing resources on-demand by means of scaling mechanisms, for example by increasing or decreasing computing resources assigned to a virtual function.

Such a conventional system with virtualization is shown in FIG. 1. A system 1 comprises physical radio access points, 'RAPs', 6 which are connected to a cloud computing platform 5 on which a set of virtual radio access functions VRAFs 4 is executed. Between the physical RAPs 6 and the VRAFs 4 a functional split is established. That means that parts of the function of a radio access technology protocol stack are executed in the radio access points RAPs 6 while other parts are executed as VRAFs 4. An example for radio access technologies is 3GPP (E-)UTRA like LTE and UMTS and other technologies. The cloud computing platform 5 is further connected to the mobile core network 8 and comprises a cloud management system 3. Further the cloud computing platform 5 or more precisely the cloud management system 3 is further connected to a management entity 2, i.e. in FIG. 1 a radio access network operation, administration and maintenance OAM system which monitors, administrates and configures radio access network entities 6.

Conventional radio access technology is not designed with virtualization and centralization. A combination of a radio access point and virtual radio access function VRAF builds one logical entity, i.e. a virtual base station. Interfaces towards the mobile core network 8 terminate in the cloud platform 5, more specifically in the upper part of a virtual base station protocol stack. On the lower part the RAP executes a set of lower layer RAN protocol stack functions depending on the deployment scenario. This could be for example functions of the radio access technology physical layer or functions of the radio access technology MAC layer. If a virtual base station is operative the radio access point RAP 6 is connected via an interface to a data center where the virtual functions are executed on a cloud platform, i.e. like it is shown in FIG. 1, the cloud computing platform 5. The cloud computing platform 5 allows for a dynamic instantiation of virtual functions. A set of VRAFs 4 execute the upper layer of the radio access network protocol stack as well as any other required functions being necessary for management and connectivity to other entities. As such a set of VRAFs 4 form a virtual radio access point, 'VRAP' 9, which is however not necessarily a logical entity on its own.

SUMMARY

In an embodiment, the present invention provides a method for providing a virtual base station in a mobile network comprising a virtual base station (VBS), wherein the VBS comprises at least one radio access point (RAP) and a virtual radio access function (VRAF). The method includes configuring the VBS by providing a description of radio access functionalities, which are executed by the RAP or by the VRAF; and jointly executing the VBS locally on the at least one RAP and on a centralized entity (CE) forming a logical functional network entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
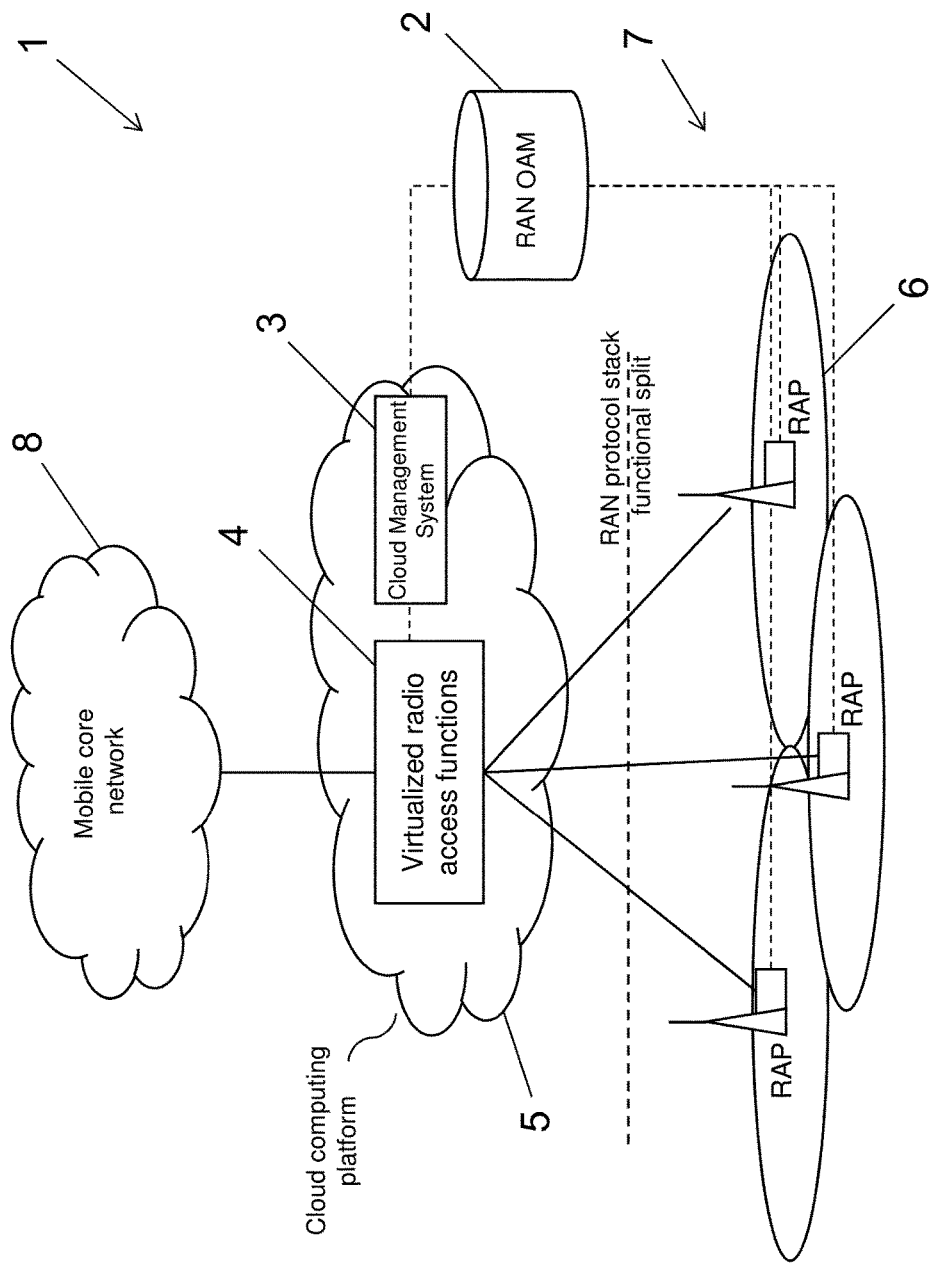
FIG. 1 shows a conventional mobile network.

Since a conventional mobile core network does not distinguish between base stations and virtual base stations, a virtual base station has to be instantiated and made aware to the network at some point. Another problem is to associate VRAFs and RAPs of the virtual base station since they are executed on different entities. A further problem is to configure such a virtual base station: conventional virtual base stations are manually instantiated and software and hardware components are correspondingly setup. Further a management of such virtual base stations is complicated.

As aspect of the present invention is provide a virtual base station in a mobile network with reduced management overhead. A further aspect of the present invention is to provide a virtual base station in a mobile network with minimized manual intervention. A further aspect of the present invention is to provide a virtual base station in a mobile network which can be flexibly deployed, integrated and managed as a single logical network entity.

Although applicable to any kind of centralized entity, the present invention will be described with regard to a cloud computing platform.

According to an embodiment of the invention, a method for providing a virtual base station in a mobile network is defined, wherein a VBS comprises at least one radio access point, 'RAP' and at least one virtual radio access function, 'VRAF', wherein the VBS is configured such forming a logical functional network entity by providing a description of radio access functionalities, which are executed by the RAP or by the VRAF and wherein the VBS is executed jointly locally on said at least one RAP and on a centralized entity, 'CE'.

According to an embodiment of the invention, a mobile network is defined, comprising at least one radio access point, 'RAP', at least one virtual radio access function, 'VRAF', a centralized entity, 'CE', on which said VRAF is executed, wherein a virtual base station, 'VBS' is provided, wherein a VBS comprises at least one radio access point, 'RAP' and at least one virtual radio access functions, 'VRAF', wherein said VBS is configured such forming a logical functional network entity by providing a description of radio access functionalities, which are executed by said RAP or by said VRAF and wherein the VBS is executed jointly locally on said at least one RAP and on said CE.

According to an embodiment of the invention, a logical functional mobile network entity is defined providing a virtual base station, 'VBS', said VBS comprising a radio access point, 'RAP', and a virtual radio access function, 'VRAF', configured by a description of radio access functionalities, which are executed by the RAP or by the VRAF.

According to an embodiment of the invention, a virtual base station, 'VBS', is defined, said VBS comprising a radio access point, 'RAP', and a virtual radio access function, 'VRAF', is configured by a description of radio access functionalities, which are executed by the RAP or by the VRAF forming a logical functional mobile network entity.

Various embodiments of the invention provides one or more of the following advantages:
 The virtual base station can be easily and highly integrated into existing operation, administration and maintenance proceedings without many modifications.
 A configuration effort is minimized, more precisely a manual instantiation and parallel setup of software and hardware components can be avoided.
 A radio access point RAP can quickly and reliably find its corresponding VRAF part.
 A virtual base station as a whole can be easily registered and integrated into the mobile core network and the operation, administration and maintenance system even if a RAP performs a different set of RAN functionality by its own, i.e. a different set of VRAFs is be required at the Cloud-RAN and/or if a RAP performs a different set of radio access technologies and therefore a different set of VRAFs dedicated to these radio access technologies is required and/or each RAP may be dedicated to a different set of services and therefore a different set of VRAFs at the Cloud-RAN is required.
 A RAP can be easily associated with a dynamically instantiated VRAF such that a virtual base station can be formed. For example in case a VRAF already exists within a central process and can be easily assigned additionally to the corresponding RAP.
 A VRAF may be instantiated for the corresponding RAP and VRAFs may communicate among each other while for example a RAP setup.
 Upon setup a RAP may be associated with a dynamically instantiated VRAF, such that a "virtual base station" can be formed, e.g.
  a VRAF may already exist within a centralized entity, e.g. a central processor or the like and may need to be assigned additionally to the corresponding RAP,
  a VRAF may be instantiated for the corresponding RAP,
  VRAFs may communicate among each other, i.e. while RAP setup the communication path of VRAFs must be set up as well
 Each RAP may perform easily and reliably a different set of RAN functionality by its own, i.e. a different set of VRAFs may be required at the Cloud-RAN.
 Each RAP may perform a different set of radio access technologies and therefore requires a different set of VRAFs dedicated to these radio access technologies.
 Each RAP may be dedicated to a different set of services and therefore requires a different set of VRAFs at the Cloud-RAN.

Various embodiments of the invention can provide the additional advantage that flexibility is enhanced since for example each RAP may be dedicated to a different set of services and may therefore require a different set of VRAFs at the centralized entity. Further each RAP may perform a different set of radio access technologies requiring a different set of VRAFs dedicated to this radio access technologies and each RAP may perform a different set of RAN functionality by its own, i.e. a different set of VRAFs may be required at the centralized entity.

One or more embodiments of the invention can enable a joint management of the physical and virtual part of a virtual base station as logical whole using said description, for example using pre-defined configuration profiles for the purpose of automatizing integration and bootstrapping in an operator's mobile network.

One or more embodiments of the invention can enable a method to instantiate and configure virtual radio access functions in a cloud environment in a flexible way depending on the operators requirements.

One or more embodiments of the invention can enable a method to integrate a virtual base station into existing radio access network operation, administration and maintenance systems and mobile core network.

The term radio access point RAP may include but is not limited to a NodeB or an evolved NodeB in case of LTE, or the like.

A virtual base station is for example a virtual NodeB or a virtual eNodeB where RAPs and VRAFs execute E-UTRA functions such as PAY, MAC, RRC, PDCP, etc. according to the non-patent literature 3GPP, "TS 36.300 V12.2.0; Evolved Universal Terrestrial Radio Access (E-UTRA) and Evolved Universal Terrestrial Radio Access Network (E-UTRAN); Overall description", June 2014.

A centralized entity may include but is not limited to a cloud computing platform or one or more computing devices communicating with each other or the like.

Each RAP may be assigned a global unique identifier, e.g. based on, but not limited to one of the following parameters: MAC address, IMSEI or the like.

Further features, advantages and further embodiments are described or may become apparent in the following:

Said description may comprise at least one of the following information: VRAF-to-RAP association information, performance information for functionality performed at a RAP, processing information, interface information for functionality performed at a RAP. This enables to provide description for radio access functionalities for configuring a virtual base station. VRAF-to-RAP association information may include but is not limited to information comprising a set of VRAFs that need to be performed for a specific RAP within a cloud platform.

Said performance information may include at least one of the following: Processing latency, processing reliability, processing jitter. This enables to describe a performance of functionality performed at the RAP.

Said processing information may include processing requirements and/or processing dependencies. Processing dependencies may for example include, but are not limited to measurements, feedback or the like, whereas processing requirements may be processing requirements for the VRAF part. These processing requirements may include, but are not limited to latency, throughput, reliability or the like. For instance, if the RAP must receive a HARQ feedback within a certain time window or whether it can cope with delayed feedback or whether feedback is not used anymore.

Said centralized entity may be configured according to the description providing at least one of the following: one or more VRAF interfaces, inter-connection of VRAF, communication requirements, software requirements. This enables the centralized entity to manage to the description of the RAP depending on the service and the radio access technology, 'RAT', provided by the virtual base station VBS.

All of the above mentioned information like performance information, processing information, etc. may depend on a service, an underlying radio access technology, a location of the radio access point like GPS coordinates or the like and/or a configuration of an operator.

Said description may be located at least partially in a RAP and/or in a centralized entity. Of course any other repository which can be accessed by the mobile network can additionally or alternatively be used. Thus, an enhanced flexibility for a virtual base station is provided.

The RAP may connect to a RAN management entity, 'RAN ME', when being powered and the RAN ME uses a VBS identifier and a RAP identifier to assign said RAP to said VBS. A VBS identifier may be a pre-configured identifier for example based on radio network planning which groups a set of co-located RAPs together to a virtual base station. The VBS identifier may also be a temporary identifier for example which is generated for the purpose of bootstrapping of the virtual base station. Further the VBS identifier may also be derived from an already existing instance of a virtual base station. This may require communication of a configuring entity for the RAN with the centralized entity. To summarize when the RAP connects to a RAN management entity an easy instantiation of a virtual base station with the RAP is enabled.

Said CE may instantiate said VRAF and may terminate mobile network functions against other network devices. This enables in an easy way to instantiate said VRAF.

The VBS may be tested prior to its regular operation. For example this may include a connectivity test between remote and virtual components. For instance an initial setup message is sent from the RAP to the VRAP or vice versa possibly comprising configuration information. Thus, the reliability of a VBS is enhanced.

Said VBS may be configured by said RAN ME. This may for example be provided by assigning mobile network global identifier such as the global eNodeB ID according to the non-patent literature of 3GPP, "TS 23.003 V10.0.0; Numbering, addressing and identification", December 2012, connectivity to the core mobile network, radio configuration or the like.

Said mobile network may further comprise a configuration entity for configuring mobile network entities. This enhances the configuration of for example the RAPs.

Said RAP may connect when being powered to said configuration entity and said configuration entity retrieves or generates a VBS identifier and assign said RAP to said VBS. A VBS identifier may be a pre-configured identifier for example based on radio network planning which groups a set of co-located RAPs together to a virtual base station. The VBS identifier may also be a temporary identifier for example which is generated for the purpose of bootstrapping of the virtual base station. Further the VBS identifier may also be derived from an already existing instance of a virtual base station. This may require communication of a configuring entity for the RAN with the centralized entity. To summarize when the RAP connects to a RAN management entity an easy instantiation of a virtual base station with the RAP is enabled.

Said configuration entity may inform said CE about said RAP and said CE instantiate said VRAF if not yet available and configured said VRAF based on said description. This enables that if a RAP is part of a virtual base station said virtual base station is instantiated with corresponding VRAFs and network functions upon RAP to begin normal operation.

FIG. 1 shows a mobile network with virtual radio access in a conventional way, which was already described above.

Figure 2:
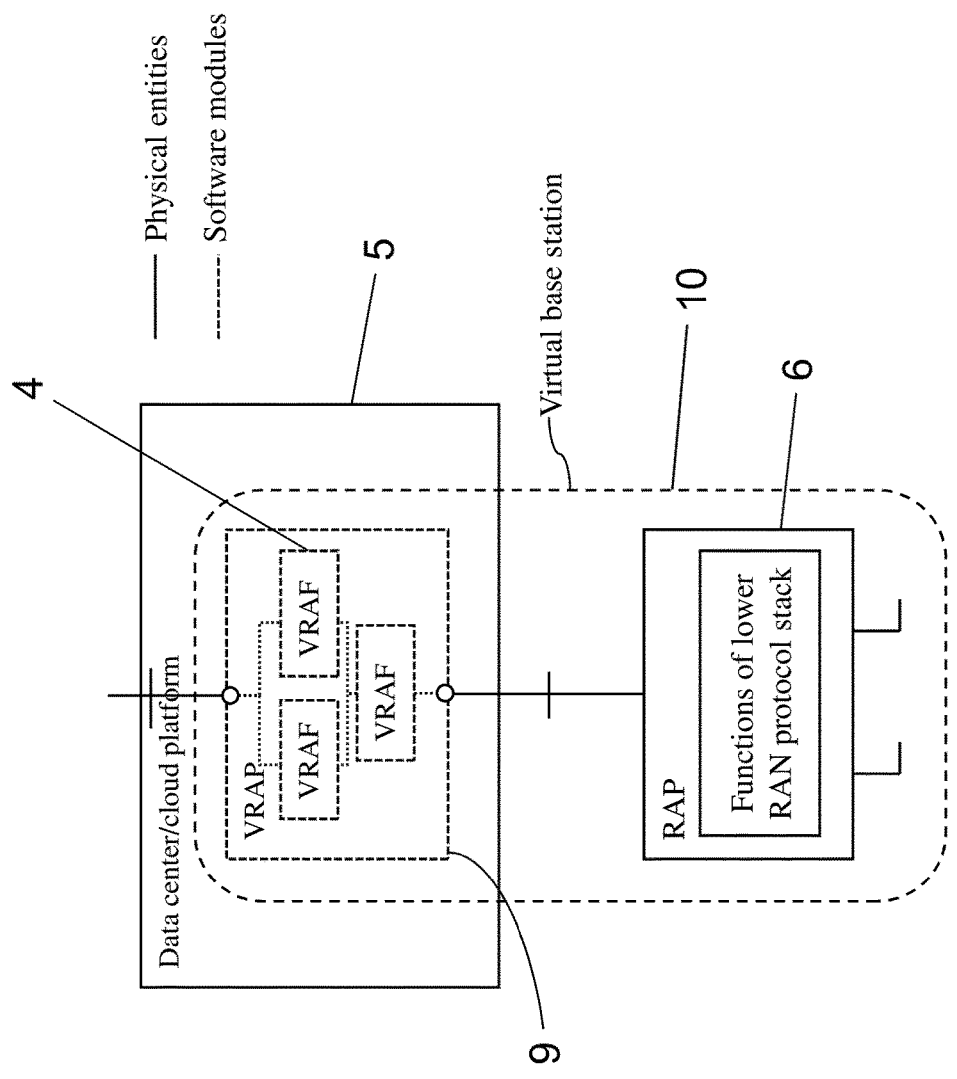
FIG. 2 shows a virtual base station according to an embodiment.

FIG. 2 shows a virtual base station according to an embodiment. In FIG. 2 a concept of a virtual base station is shown. In the lower part a RAP 6 is depicted executing a set of lower layer RAN protocol stack function depending on the deployment scenario. This may for example be the function of the radio access technology physical layer or function of the radio access technology MAC layer.

If the virtual base station 10 is operative the RAP 6 is connected via an interface to a data center 5, where the virtual functions VRAF 4 are executed on a cloud platform. The cloud platform 5 allows for dynamic instantiation of virtual functions. A set of VRAFs 4 execute the upper layer of the RAN protocol stack as well as any other required functions being necessary for management and connectivity to other network entities. As such the set of VRAFs 4 form a virtual radio access point VRAP 9 which is however not necessarily a logical entity on its own.

To configure said virtual base station 10 which is defined as a logical functional entity being executed jointly on local sides and in cloud computing platforms 5 each virtual base station 10 is represented by a description of radio access functionalities being executed by the RAP 6 and by the VRAFs 4. Said description may comprise at least one of the following:

The set of VRAFs 4 that need to be performed for a specific RAP 6 within the cloud platform,
Interfaces towards functionality performed at the RAP 6,
Performance description of functionality performed at the RAP 6, e.g. processing latency, processing reliability, processing jitter,
Processing dependencies, e.g. on measurements, feedback, etc.,
Processing requirements on the VRAF 4 part, e.g. latency, throughput, reliability (for instance, if the RAP 6 must receive HARQ feedback within a certain time window or whether it can cope with delayed feedback or whether feedback is then simply not used anymore).

Depending on the service and RAT provided by the VBS 10, the description of the RAP 6 is complemented in a cloud management system 3 by
Interfaces of each VRAF 4,
Inter-connection of VRAF 4,
Communication requirements, e.g. throughput, delay, drop rate,
Software requirements, e.g. SW jitter, SW drop rate.

All this information may depend on the service, RAT, location of the RAP 6 (e.g., GPS coordinates), and the operator configuration.

This description can be located completely or partially either in the RAP 6, in an OAM system 2, and/or in any other repository which can be accessed by the cloud management system CMS 3 and/or the OAM system 2.

Based on this description, the RAP 6, the OAM 2, or other sources, may

- Provide an own set of VRAFs that are integrated into the VBS 10,
- Exchange this set of requirements with different Cloud-RANs operated by different mobile network operators,
- Provide different descriptions depending on service, RAT, location, and operator.

Figure 3:
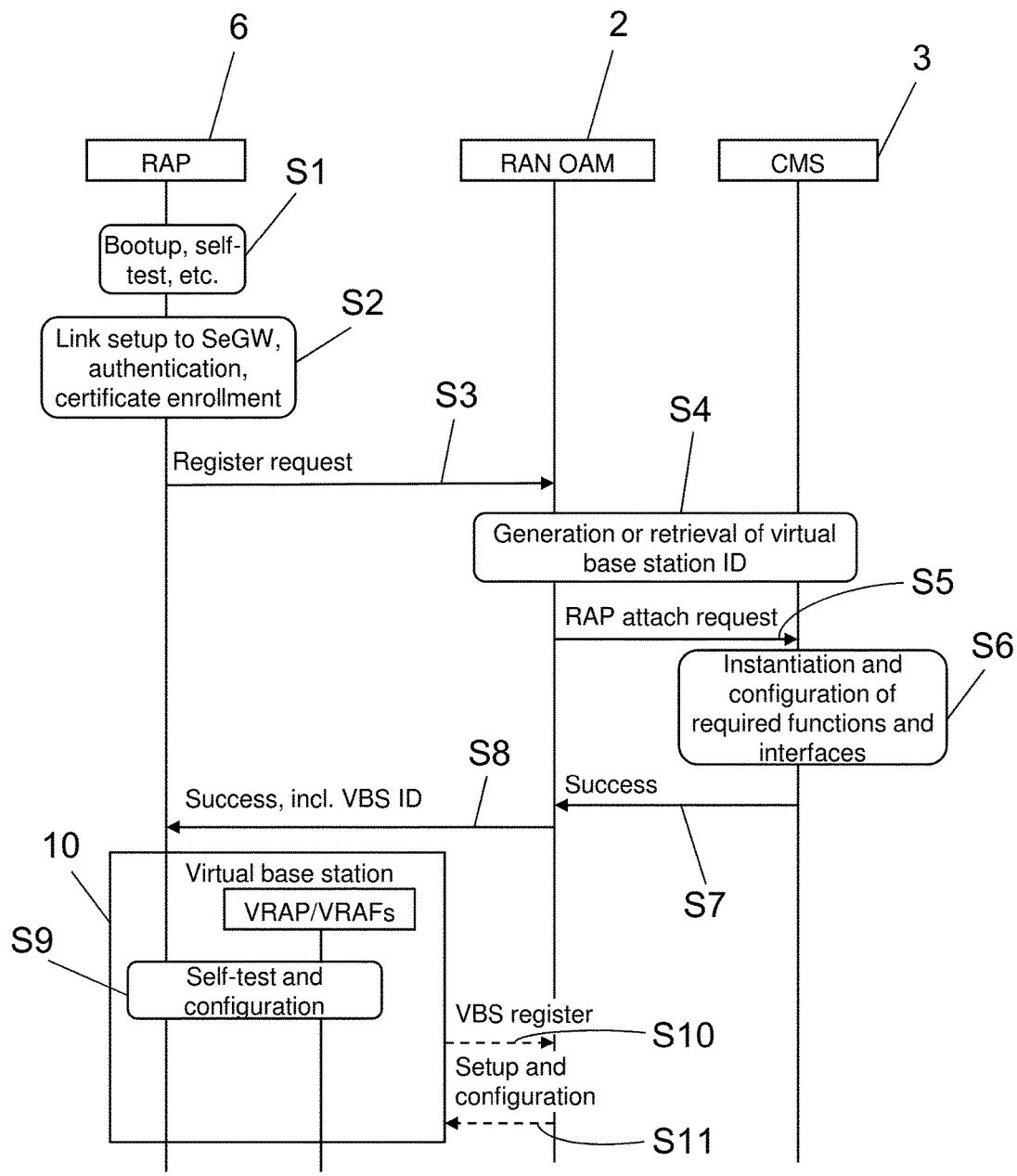
FIG. 3 shows steps according to a further embodiment.

FIG. 3 shows steps according to a further embodiment.

In FIG. 3 steps for configuring and instantiating a virtual base station 10 are shown between a RAP 6, a RAN OAM 2 and a CMS 3.

In a first step S1 the RAP 6 performs a bootup, a self-test, etc., i.e. when the RAP 6 is powered on initialization procedures like self-tests, etc. are performed.

In a second step S2 connectivity to a security gateway is established and authentication and verification routines may be executed. Step S2 includes therefore a link setup to a security gateway, and an authentication and certificate enrollment.

In a third step S3 the RAP 6 connects to the RAN OAM system 2 by a corresponding registering request. The RAP 6 is then included in the OAM system inventory.

In a fourth step S4 the RAN OAM 2 performs a look up using a RAP identifier and retrieves or generates an identifier of the virtual base station 10 it is assigned to. Step S4 therefore provides a generation or retrieval of a VBS ID. Said VBS identifier may be

- a pre-configured identifier, based on radio network planning which groups a set of co-located RAPs together to a virtual base station
- a temporary identifier, which is generated for the purpose of bootstrapping
- derived from an already existing instance of a virtual base station. This may require communication of the RAN OAM 2 with the CMS 3 at this point.

In a fifth step S5 the RAN OAM 2 performs a RAP attach request with the CMS 3. That means that the RAN OAM 2 notifies the cloud management system CMS 3 that a RAP 6 is going to be connected to its virtual base station 10. A CMS 3 may be responsible for insinuating, terminating, scaling, configuration, resource provision, etc. in the cloud platform. A CMS 3 may for example realized by an implementation of the ETSI NFV framework.

In a sixth step S6 the CMS 3 performs instantiation and configuration of required functions and interfaces. That means for example that the CMS 3 instantiates corresponding VRAFs 4 and network functions if not yet available:

- A set of VRAFs 4 is instantiated to handle the virtualized RAN protocol stack (depending on the selected RAN functional split, operator configuration, location, service requirements, etc.).
- Network functions are instantiated to terminate network interfaces towards the core network.
- Network functions (such as a VRAF gateway) are instantiated for terminating the interfaces towards the RAPs 6.
- VRAFs are configured with the virtual base station identifier such that the association to a virtual base station is known.

The CMS 3 reports in a seventh step S7 the success of the instantiation and configuration of required functions to the RAN OAM 2. The network functions are then configured, for example by a specific CMS function to route data from RAP 6 to corresponding VRAFs 4, for example based on the global RAP and virtual base station VBS identifier. The RAP 6 is now connected to the VRAFs 4 executing upper layer RAT functions and the full RAT protocol stack spanning VRAF 4 and RAP 6 being available.

In an eighth step S8 a RAN OAM 2 reports the success of the instantiation and configuration of the virtual base station 10 back to the RAP including the virtual base station identifier, e.g. including sending of an acknowledgement.

In a ninth step S9 self-test of the virtual base station is performed for example including a connectivity test between remote and virtual components. For instance an initial interface setup message is sent from the RAP 6 to the VRAP 4 or vice versa possibly comprising configuration information. Step S9 performs therefore a self-test and configuration of its components RAP 6 and VRAF 4.

The virtual base station 10 connects in a tenth step S10 to the RAN OAM 2 if this is not yet the case and the virtual base station 10 is registered as base station in the RAN OAM inventory. The virtual base station 10 is then configured in an eleventh step S11 by the RAN OAM 2, for example by assigning of mobile network global identifiers such as the global eNodeB-ID as disclosed in 3GPP, "TS 23.003 V10.0.0; Numbering, addressing and identification", December 2012, connectivity to the core network, radio confirmation, etc.

After that the virtual base station 10 is in an operational state.

To describe a virtual base station, in particular the virtual eNodeB as in the case of LTE a data model language such as disclosed in the non-patent literature of IETF, "YANG—A Data Modeling Language for the Network Configuration Protocol (NETCONF)", October 2010 may be employed. In case of LTE the base station is called eNodeB, the RAT type is E-UTRA. The VBS would thus be a virtual eNodeB, 'VENB', where RAPs 6 and VRAFs 4 execute E-UTRA functions such as PHY, MAC, RRC, PDCP, etc. as disclosed in the non patent literature 3GPP, "TS 36.300 V12.2.0; Evolved Universal Terrestrial Radio Access (E-UTRA) and Evolved Universal Terrestrial Radio Access Network (E-UTRAN); Overall description", June 2014.

The following example illustrates a concept for a processing delay requirement for a certain VRAF:

```
container req-processing-delay {
    leaf max-delay {
        type uint8;      % value in 10ns steps, 255 = infinite
    }
    leaf hard-deadline {
        type Boolean;
    }
    ...
}
```

All requirements, interfaces and/or dependencies may be expressed in this model language and used for setting up the virtual eNodeB.

In summary one or more embodiments of the present invention enable management of the physical and virtual parts of the virtual base station as the logical whole using pre-defined configuration profiles for the purpose of automatizing integration and bootstrapping into an operational network.

One or more embodiments of the present invention provide a method to instantiate and configure virtual radio access functions in a cloud environment in a flexible way depending on the operating requirements.

One or more embodiments of the present invention enable a method to integrate a virtual base station into existing RAN OAM in mobile core networks.

One or more embodiments enable in a flexible way to deploy, integrate and manage virtual base stations as a logical network unit.

One or more embodiments enable a reduction of management overhead and a minimization of manual intervention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing a virtual base station (VBS) in a mobile network, the method comprising:
   receiving, at a radio access network (RAN) operation, administration and maintenance (OAM) system, a register request from at least one radio access point (RAP) in the mobile network;
   generating or retrieving, by the RAN OAM system, a VBS identifier (VBS ID) using an identifier of the at least one RAP; and
   forming the VBS by instantiating at least one virtual radio access function (VRAF) to be executed by a centralized entity (CE) and associating the at least one VRAF to the at least one RAP using the VBS ID so as to provide a flexible RAN functional split between the at least one RAP and the at least one VRAF which jointly form the VBS.

2. The method according to claim 1, wherein the instantiating of the at least one VRAF is performed using a description of radio access functionalities to be achieved in the RAN functional split and comprises at least one of the following: VRAF-to-RAP association information, performance information for functionality performed at the at least one RAP, processing information, or interface information for functionality performed at the at least one RAP.

3. The method according to claim 2, wherein the performance information includes at least one of the following: processing latency, processing reliability, or processing jitter.

4. The method according to claim 2, wherein the processing information includes at least one of the following: processing requirements or processing dependencies.

5. The method according to claim 2, wherein the CE is configured according to the description of radio access functionalities providing at least one of the following: VRAF interfaces, inter-connection of interfaces, communication requirements, or software requirements.

6. The method according to claim 2, wherein the description of radio access functionalities is located at least partially in the at least one RAP.

7. The method according to claim 1, wherein the at least one RAP is configured to connect to the RAN OAM automatically upon starting.

8. The method according to claim 7, wherein the CE instantiates the VRAF and terminates mobile network functions against other mobile network entities.

9. The method according to claim 1, wherein the VBS is tested.

10. A mobile network, comprising
    at least one radio access point (RAP);
    at least one virtual radio access function (VRAF);
    a centralized entity (CE), on which the at least one VRAF is executed,
    wherein a virtual base station (VBS) is formed jointly by the at least one RAP and the at least one VRAF which has been instantiated and associated to the at least one RAP using a VBS identifier (ID), which was generated or retrieved using an identifier of the at least one RAP, so as to provide a flexible RAN functional split between the at least one RAP and the at least one VRAF.

11. The mobile network according to claim 10, wherein the mobile network further comprises a radio access network (RAN) operation, administration and maintenance (OAM) system for configuring mobile network entities.

12. The mobile network according to claim 11, wherein the at least one RAP is configured to connect during booting to the RAN OAM system, and the RAN OAM system is configured to determine the VBS ID and to associate the VBS ID to the at least one RAP.

13. The mobile network according to claim 11, wherein the RAN OAM system is configured to inform the CE about the at least one RAP, and the CE is configured to instantiate the at least one VRAF if not yet available and to configure the at least one VRAF based on a description of radio access functionalities to be achieved in the RAN functional split.

14. A logical functional mobile network entity providing a virtual base station (VBS), the VBS being jointly formed by at least one radio access point (RAP) and at least one virtual radio access function (VRAF) which has been instantiated and associated to the at least one RAP using a VBS identifier (ID), which was generated or retrieved using an identifier of the at least one RAP, so as to provide a flexible RAN functional split between the at least one RAP and the at least one VRAF.

* * * * *